Oct. 4, 1966   L. S. TURNER   3,277,219
METHOD OF MOLDING A BUILDING STRUCTURE BY SPRAYING A
FOAMED PLASTIC ON THE INSIDE OF AN INFLATABLE FORM
Filed March 27, 1961   4 Sheets-Sheet 1
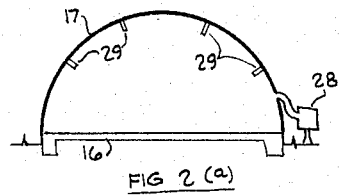
FIG. 2 (a)
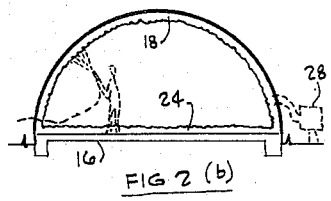
FIG. 2 (b)
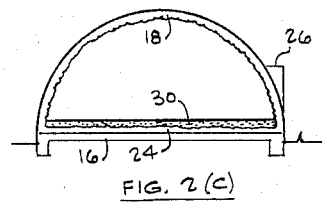
FIG. 2 (c)
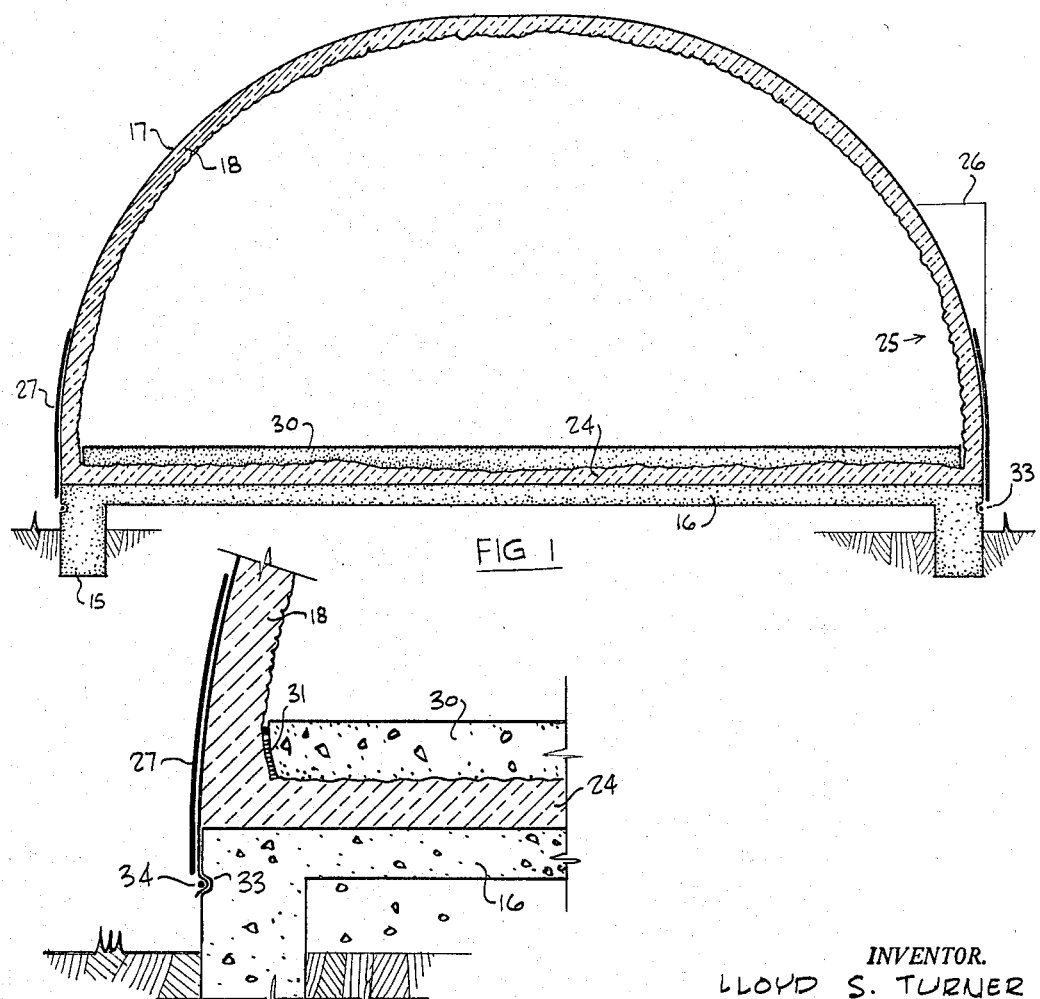
FIG. 1
FIG. 3
INVENTOR.
LLOYD S. TURNER
BY
Edward A. Robinson
attorney

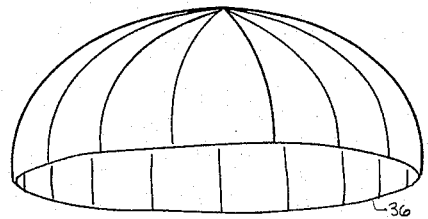
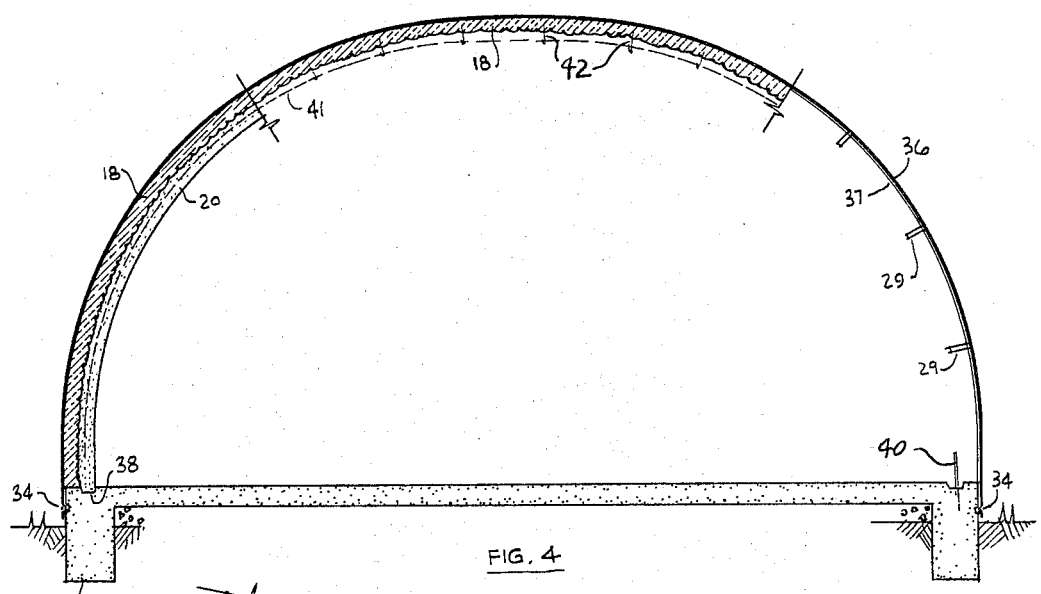
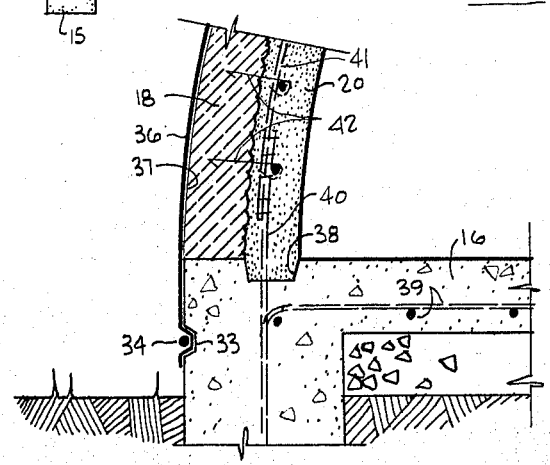

Oct. 4, 1966 L. S. TURNER 3,277,219
METHOD OF MOLDING A BUILDING STRUCTURE BY SPRAYING A
FOAMED PLASTIC ON THE INSIDE OF AN INFLATABLE FORM
Filed March 27, 1961 4 Sheets-Sheet 3
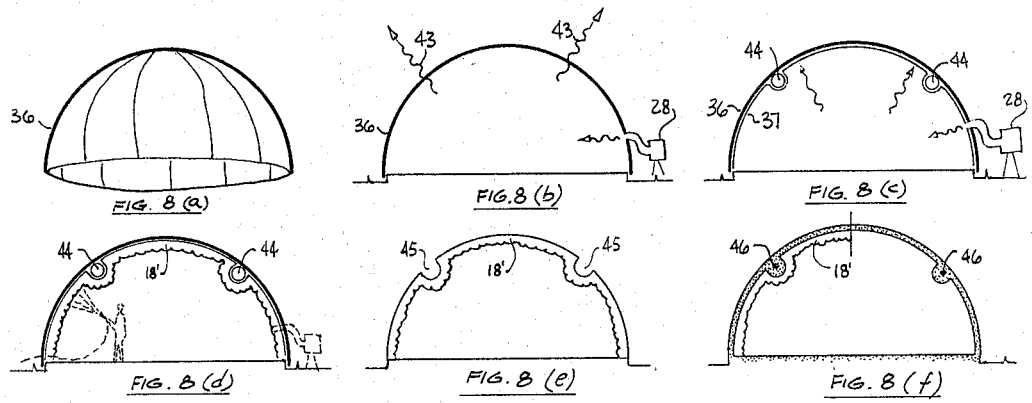
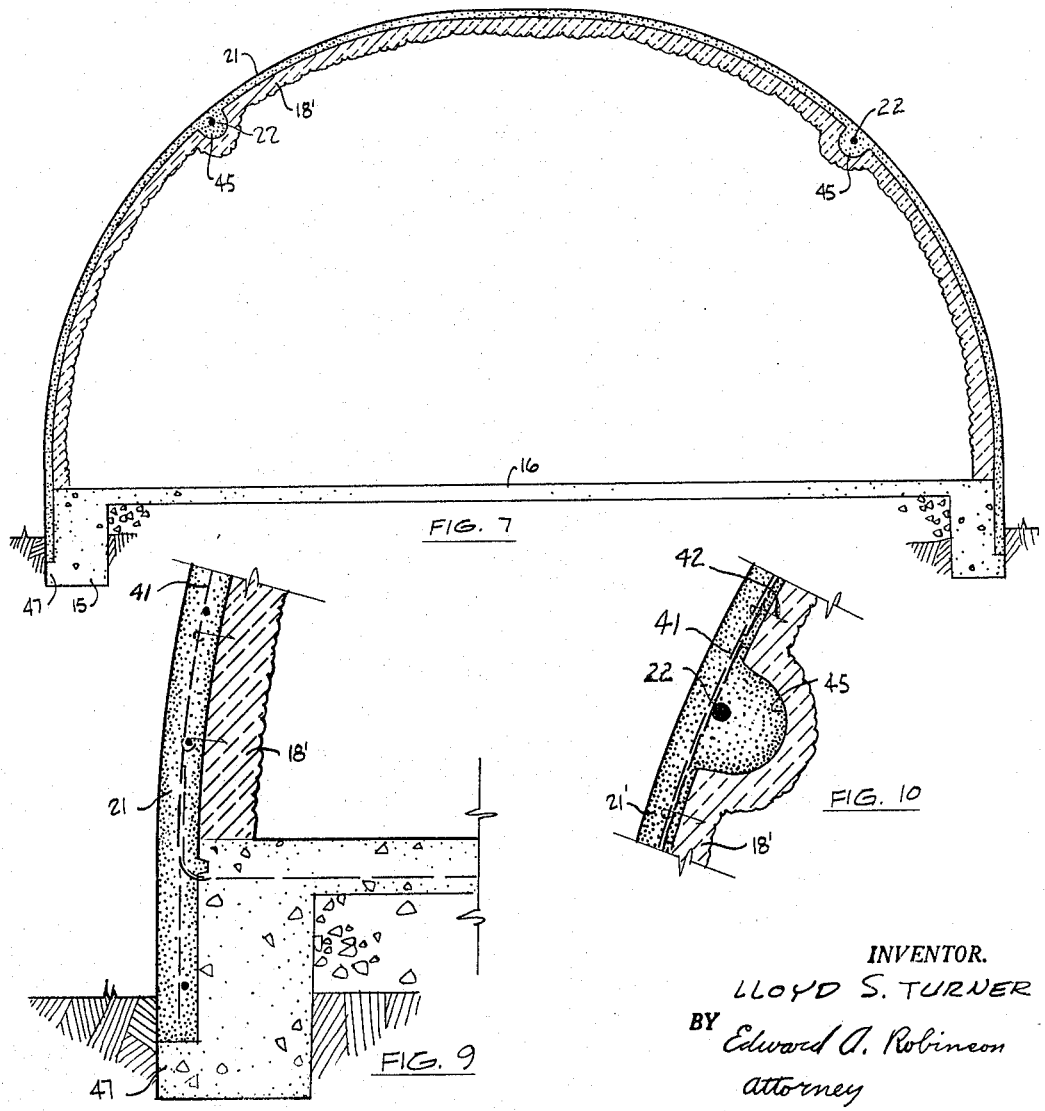
INVENTOR.
LLOYD S. TURNER
BY Edward A. Robinson
attorney

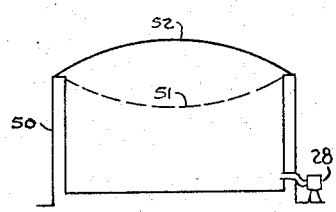 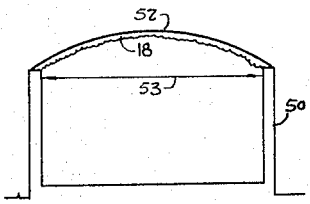 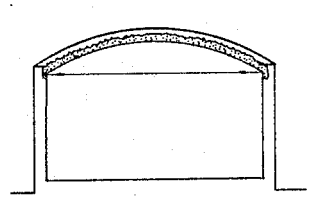
FIG. 12(a)　　FIG. 12(b)　　FIG. 12(c)
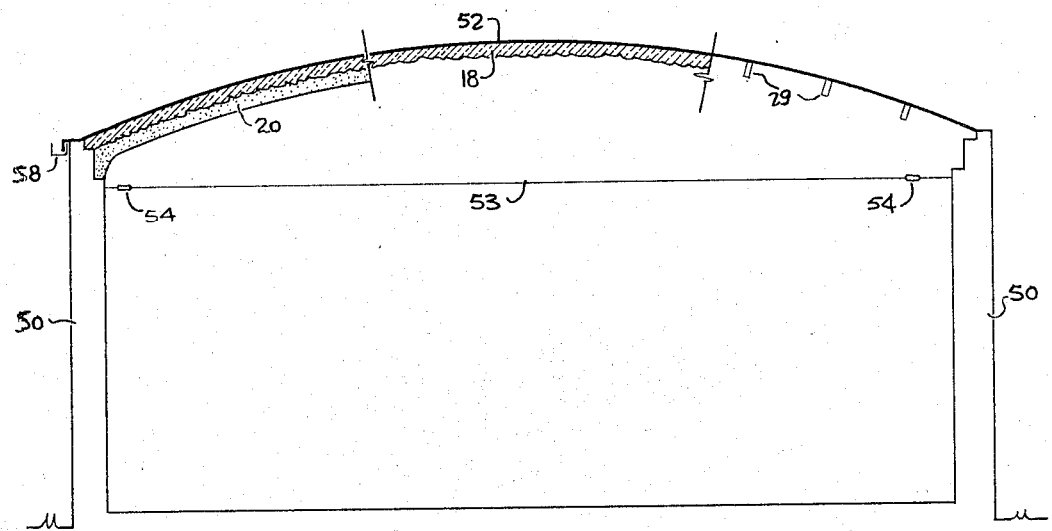
FIG. 11
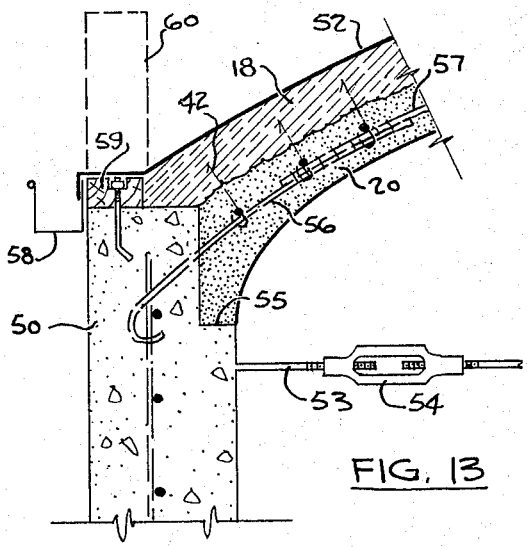
FIG. 13
INVENTOR.
LLOYD S. TURNER
BY Edward O. Robinson
Attorney

United States Patent Office 3,277,219
Patented Oct. 4, 1966

3,277,219
METHOD OF MOLDING A BUILDING STRUCTURE BY SPRAYING A FOAMED PLASTIC ON THE INSIDE OF AN INFLATABLE FORM
Lloyd S. Turner, 4118 Park Blvd., Palo Alto, Calif.
Filed Mar. 27, 1961, Ser. No. 98,457
13 Claims. (Cl. 264—45)

This invention relates to building structures and methods for erecting same, and more particularly, this invention relates to structures erected by spraying a plastic foam or like material against pneumatically inflated forms.

Traditionally, buildings have been erected with the use of lumber, bricks, blocks and the like in generally rectangular configurations. Lumber, bricks, etc. are rigid materials and may be most easily shaped with straight sides and square corners, and this fact tends to require that structures built therefrom likewise have the straight sides and square corners of rectangular configurations. Other materials such as reinforced concrete can be molded in interesting curved shapes, but forms are required to shape and support such materials in an initial fluid or plastic state. Since concrete forms have been generally constructed of lumber, it has been simpler and more economical to maintain its inherent rectilinear shape in the fabrication of forms and hence rectilinear concrete structures. Construction of wooden forms in complex curved shapes requires a great expenditure of materials, time and effort. Heretofore, building construction using concrete has necessitated the erection of two structures—first, wooden forms are built, and secondly the concrete is poured or sprayed and is temporarily held in place by the forms, then the wooden forms are removed and discarded.

It is an object of this invention to provide an improved method for erecting a building from a plastic or concrete material, and more particularly, it is an object to provide such a method of construction without using costly forms.

Another object of this invention is to provide an improved economical method for erecting a building, and more particularly for spraying a material such as a plastic or polyurethane foam against an inner surface of an inflated form to build up a layer which will be self-supporting, and which may in itself constitute a light weight building, or may provide a suitable base upon which a more durable material such as concrete may be applied.

A further object of this invention is to mold such a structure from a plastic foam having a weather impervious outer layer or skin, and more specifically, it is an object to provide a shaped envelope of the impervious plastic which may function first as a form for the plastic foam, and which will remain to constitute the permanent outer layer or skin of the building.

Another object of this invention is to provide an improved method and means for reinforcing a thin shell building structure erected from sprayed-on material wherein channels are formed therein for the subsequent insertion of reinforcing members.

A further object of this invention is to mold an improved building structure by spraying a layer of plastic foam which will become self-supporting and may provide initial support to further layers of reinforced concrete or the like.

Numerous other objects and advantages will be apparent throughout the progress of the specification which follows. The accompanying drawings illustrate certain selected embodiments of the invention and the views therein are as follows:

FIGURE 1 is a vertical sectional view of a building structure which could be used for cold storage or the like wherein thermal insulation is of importance.

FIGURES 2(a), 2(b) and 2(c) illustrate the steps in the erection of the building shown by FIGURE 1;

FIGURE 3 is an enlarged fragmentary detail of FIGURE 1;

FIGURE 4 is a vertical sectional view of an alternative type of building;

FIGURE 5 is a reduced perspective view of a form which may be used in the erection of the building of FIGURE 4;

FIGURE 6 is an enlarged fragmentary detail of FIGURE 4;

FIGURE 7 is a vertical sectional view of another alternative form of a building;

FIGURES 8(a) through 8(f) illustrate the method of construction of the building of FIGURE 7;

FIGURE 9 is an enlarged fragmentary detail of FIGURE 7;

FIGURE 10 is another enlarged fragmentary detail of FIGURE 7;

FIGURE 11 is a vertical section of a building having a roof structure in accordance with this invention;

FIGURES 12(a), 12(b) and 12(c) illustrate the method of construction of the building of FIGURE 11; and FIGURE 13 is an enlarged fragmentary detail of FIGURE 11.

Briefly stated, according to this invention, a building may be erected by first laying a foundation 15, and a floor slab 16. A pliable, or elastic membrane or fabric form 17 is secured to the foundation 15, and thence inflated. A material such as plastic foam is thence sprayed against the form from the inside to build up a layer 18 which will become rigid and will be self-supporting. The form 17 may be of impervious plastic sheet material which may remain as an outer skin which may be reflective to heat, water tight and weather proof. The sprayed-on layer 18 may be a foam of polyurethane resin. As shown by FIGURE 4 a further layer 20 may be built up within the layer 18 by spraying a concrete mixture against the plastic foam layer 18 to provide a more durable and permanent structure. As indicated in FIGURE 7, a concrete layer 21 may be applied to the outside of the foam layer. Reinforcing members 22 may be placed within channels formed in a foam layer 18′ to provide a final structure of reinforced concrete. As indicated in FIGURE 11, the spraying of a plastic foam layer 18 and a concrete layer 20 may be used to erect a roof structure for a building having conventional foundation and walls.

With reference to FIGURE 1, a cold storage structure may comprise a layer of rigid plastic foam such as polyurethane 18 covered by an impervious plastic layer 17 which may have a highly reflective surface. The plastic foam may be sprayed or poured upon the concrete floor slab 16 to constitute a thermal insulating sub-floor layer 24 which may be formed integral with the wall and roof layer 18. A doorway 25 may be cut through the plastic layers 17 and 18 and a doorframe structure 26 fitted therein. The weight of the upper portion of the dome top pressing downwardly will stress the more vertical portion of the wall 18 tending to deform the lower sections outwardly. A tension ring 27 may be positioned about the lower portion of the dome and secured to the doorframe 26 to hold in the walls preventing a spread under the weight of the upper structure.

The steps in erecting this cold storage dome structure are shown in FIGURES 2(a), 2(b) and 2(c). Initially, the plastic skin or impervious layer 17 is secured to the foundation and inflated by a means such as an air compressor or blower 28. A plurality of wall thickness gauges 29 are spaced uniformly about and secured to the inside surface of the form 17 by means such as an adhesive. The wall thickness gauges 29 may be small blocks of the polyurethane plastic foam which have been cut to proper dimensions to provide indications of a uniform depth or thickness from the form. With the wall thickness gauges in place, a plastic foam such as polyurethane is sprayed against the form 17 from the inside to build up a self-supporting layer. By means of the thickness gauges, the spray gun operator may judge the thickness of the layer as it is being built up, and he may uniformly cover the form 17 to the depth of the gauges 29. The plastic foam will harden quickly and will become integral with the gauge blocks 29 to constitute the uniform layer 18.

It is contemplated that the outer form 17 be light in weight and may be held inflated by a relatively low internal pressure. The air compressor or fan 28 may remain in operation from the time the form is initially inflated until the spraying operation is completed, and any air lost due to leakage of air from accidental or intentional vent holes will be replaced by the compressor and will not be detrimental in the maintaining of the inflated form. Indeed, it is contemplated that the man operating the spray equipment will enter the inflated form by opening a flap or lifting the side from the foundation slightly.

During the spraying operation it is desirable to continually exhaust air from the inflated form and to continually replace the air by means of the compressor or blower whereby fumes from the spray will not accumulate unduly. Therefore, a vent hole may be intentionally provided, and further openings or cracks inadvertently permitted in the form and enclosure will not be detrimental. It may be necessary that the spray gun operator wear a mask which is supplied with fresh air from the exterior of the enclosure. The air supply for the operator may actually be tapped off the spray gun equipment which will require an air hose in any event. If the form is light in weight it may be inflated by air pressure on the order of 1 in./Hg and this pressure may easily be maintained by the compressor in spite of vent holes which may be inherent in the form.

Although various types of plastic materials are available which may be sprayed on a surface and which will harden into a self-supporting layer, one preferred material is a polyurethane resin with a catalyst added to cause foaming action. This material is commercially available and sold by the Mobay Chemical Company of Pittsburgh, Pennsylvania, and by others. This plastic foam will expand and harden within a few seconds after it is mixed and sprayed on a surface. After becoming rigid, the material is cellular, light in weight and an excellent thermal insulator. This polyurethane resin is very adhesive as it is sprayed, and upon hardening it will bond firmly to most surfaces and materials against which it is sprayed.

When hardened the polyurethane foam is rigid and will withstand some mechanical stress by itself. However, the tensile strength of the material may be greatly increased by the inclusion of reinforcing fibres or rovings into the material as it is sprayed. It is contemplated to introduce glass fibre rovings near the spray nozzle such that the fibres may enter the spray stream and be deposited with the polyurethane against the surface of the form. The glass fibres may be initially woven and coiled as a "rope" to be carried by the spray gun operator. This rope feeds into a chopper near the spray nozzle, whereupon it is cut into three quarter inch to two inch lengths and is fluffed to separate the individual fibres which are blown into the jet stream of polyurethane emerging from the nozzle of the spray equipment. A mixing action will take place as the spray stream strikes against the form surface, and the glass fibre rovings will be evenly distributed within the foam layer 18. Because of the great bonding strength of the polyurethane foam, the fibres will become integrally embedded within the hardened foam and because of their superior tensile strength will substantially increase the tensile strength and general durability of the foam layer 18.

FIGURE 2(b) illustrates the cold storage dome after the spraying operation and it will be noted that a subfloor 24 is integrally formed with the dome layer 18 either by the same spraying operation or by a pouring operation. FIGURE 2(c) illustrates the final steps in construction with the door frame 26 shown in place and with a working floor surface 30 laid over the subfloor layer 24. As shown in FIGURES 1 and 3 the working floor surface 30 may be a concrete slab poured upon the layer 24 as a final step. An appropriate expansion joint 31 may be placed around the periphery of the slab. This expansion joint may include resilient material such as cork or other freeze proof expansion joint material.

In cold storage structures it may be required to provide ventilation beneath the floor to prevent the ground thereunder from freezing. Ventilation may be provided by elevating the floor slab 16 slightly above the ground on the foundation 15. However, a more economical ventilation means may be provided by laying pipes horizontally across the floor slab 16 with the ends thereof opening to the air outside of the foundation 15.

The method of securing the form 17 to the foundation 15 may be understood with reference to FIGURE 3. The foundation 15 is formed with a peripheral channel or groove 33. The peripheral portion of the form 17 overlaps the groove 33 and a flexible tension ring 34 may be placed therein and tightened around the periphery of the structure to clamp the form 17 in place. Thus, the groove 33 and ring 34 constitute a clamping means for securing the form 17 to the foundation 15. After the foam layer 18 has been sprayed and has become rigid, the impervious material 17 will be bonded to and supported by the layer 18. The ring 34 will then function to anchor the finished structure to the foundation, and the lower portion of the material 17 which overlaps the foundation will provide a water proof flashing covering the joint between the vertical side structure and the foundation.

An alternative form of a building structure is shown by FIGURES 4, 5 and 6. As shown in FIGURE 5, an inflatable form 36 may be made from an impervious material as was the layer 17 of FIGURE 1, or alternatively it may be of canvas or other fabric material and may comprise panels joined together in seams or the like. The form of FIGURE 5 may be secured to a foundation 15 and the floor slab 16 by means of a tension ring 34 within a groove 33 in the same manner as discussed in connection with FIGURES 1 and 3. If the form 36 is of impervious material, it will ultimately constitute an outer skin for the finished structure. If the form 36 is of canvas or other fabric which is not impervious, air will seep therethrough when the form is inflated. The air lost due to this seepage will be replaced by the air compressor as will air lost due to imperfect flap closures and intentional vent holes.

After inflation of the fabric form 36, thin sheets 37 of impervious plastic, metal foil, or other material may be laid against the form from the inside thereof. These sheets 37 of impervious material will block the seepage of air through the fabric form 36 and will be held against the form by the pressure differential between the inside and the outside thereof. Thus, each sheet 37 of impervious material will appear to stick in place against the inner surface of the fabric form 36, although no actual adhesive material is used against the surface of the form. Alternatively an impervious inner liner may be made of a thin inexpensive material such as paper treated to be impervious. This inner liner will be held by the fabric form 36 as both are inflated together.

When the entire inner surface of the fabric form 36 is lined with impervious sheet material, the air pressure may increase within the form since the air seepage is decreased, and the sheets 37 will support light weight wall thickness gauge blocks 29. The gauge blocks 29 may be secured to the sheet material 37 by means such as adhesive, and the spraying of the plastic foam may be accomplished essentially as described in connection with FIGURES 1 and 2(b). After the foam layer 18 has hardened and has become self-supporting, the fabric form 36 is no longer necessary and may be removed. Since there is no bond between the fabric form 36 and the impervious sheet material 37, the clamping ring 34 may be loosened, permitting the form 36 to be removed and reused on further structures. In this case, the impervious sheet material 37 will be bonded to the plastic foam layer 18 and will constitute the outer skin of the structure.

FIGURE 4 shows a concrete layer 20 which may be sprayed against and built up within the plastic foam layer 18. If the structure of FIGURE 4 is to be used for cold storage, the polyurethane foam layer 18 will provide a principal thermal insulating layer, and the thermal insulation qualities of the concrete layer 20 will be of secondary importance. In such a structure the temperature gradient between the cold interior and the relatively warm exterior may exist principally within the foam layer 18. This feature is of importance since no point within the concrete layer 20 need be subjected for extended times to the critical freezing point condition of 32° F. If concrete is continually subjected to alternate freezing and thawing, internal stresses continually set up therein will eventually weaken the layer; however, no such problem will exist with respect to the polyurethane foam. Thus, a temperature gradient may be established such that the critical 32° F. condition will exist within the foam layer 18 rather than the concrete layer 20. In other embodiments of this invention, the concrete layer is exterior to the plastic foam layer 18 or 18' and the critical freezing point temperature (32° F.) may never be subjected upon any part of the concrete layer.

The polyurethane foam layer of this invention has proven superior to other forms of thermal insulation since it is not derived from vegetable matter and will never rot even though subjected to moisture. The moisture will not enter into the cellular interior, and therefore, the polyurethane foam, free from moisture, is not affected by frost or freezing.

The foundation 15 may be formed with a key 38 which will be a peripheral groove extending around the foundation 15. The concrete layer 20 is sprayed against the foam layer 18 and into the key 38 to provide additional strength to the structure. The foundation 15 and floor slab 16 may be constructed by conventional means using reinforcing rods or members 39. Further reinforcing rods 40 extend upwardly from the foundation 15 to the keyway 38 ultimately to become a part of the reinforcing structure of the sprayed concrete layer 20. Further reinforcing rods 41 are positioned by means of hangers attached to the dome structure after the layer 18 has hardened but before the spraying of the concrete layer 20. Thus, it may be appreciated that erection of the structure of FIGURES 4 and 6 commences with the basic structure of FIGURES 1 and 3, and provides the further strength and permanence of reinforced concrete added to the plastic layer. The plastic foam layer 18 provides a convenient, relatively inexpensive form for the concrete layer 20 with complex curvature. While the reinforced concrete layer 20 gives the structure its primary strength and durability, it is not necessary to remove the foam layer 18 which will contribute thermal insulation qualities to the structure.

The reinforcing members or rods 41 may be initially supported and spaced from the foam layer 18 by clips as shown in FIGURE 6. The clips may be of wire having a barbed or turned back forward end and having an open loop at the rearward end. These wires may be forced into the foam layer by pressure or by hammering. The barbed or turned back end will secure the clip in the foam layer preventing withdrawal thereof. The reinforcing rods may then be placed within the open loops of the rearward ends of the clips, and the loops may be closed by means such as a pliers.

FIGURE 7 illustrates another form of this invention. As in the cases of FIGURES 1 and 4 the constructure may be started by laying a foundation 15 and floor slab 16. A form 36 shown by FIGURE 8(a) is made of canvas or other fabric similar to that of FIGURE 5. The form 36 is secured to the foundation 15 and inflated by an air compressor 28 as shown in FIGURE 8(b). As in the case of FIGURE 4, a continual seepage of air passes through the form as indicated by arrows 43, FIGURE 8(b). Elongated tubes or members 44 may be placed against the fabric form 36 and will be held in place by the differential in air pressure and the air seepage. It is contemplated that the elongated members 44 may each be a rubber or plastic balloon which, when inflated, will maintain a regular shape but will be extremely light in weight. Sheets of light weight impervious material may then be laid against the canvas form 36 and covering the balloons 44. These sheets of material will hold themselves and the balloons in place against the canvas form 36 by pressure from within as shown in FIGURE 8(c). A layer of plastic foam material 18' is thence sprayed from the inside against the sheets of impervious material 37 and around the balloons 44 as shown in FIGURE 8(d).

After the layer 18' has hardened, the canvas form 36 may be removed and reused elsewhere. The balloons 44 may be removed or cut into from the outside leaving exposed channels 45 extending in the pattern originally established by the balloons about the outside of the self-supporting layer 18 as shown in FIGURE 8(e). Reinforcing rods or members 22 may be positioned within the channels 45 and a layer of concrete mixture may be plastered on or sprayed against the outer surface of the plastic foam layer 18'. As shown by FIGURE 8(f) the concrete layer will extend from a toe or ledge 47 on the foundation 15 upwardly over the dome shape enclosing the channels 45 and reinforcing the rods 22 therein.

By the above methods, reinforcing members may be installed according to a general pattern or arrangement to reinforce a concrete layer. Additionally, further reinforcing members may be installed in specific locations around intended openings which may be made later in the ultimate structure. A structure with extensive openings may be constructed in accordance with this invention by first inflating a form and spraying a layer of plastic foam on the inside thereof as indicated heretofore. The form and plastic layer will initially have no large openings therein, but will provide a base for a concrete layer which may include the extensive openings. After the concrete layer has cured, the plastic supporting structure may be cut away or otherwise removed, either completely or in part, whereby the final structure may have the large openings therein.

A final step may be to remove the plastic foam layer as shown by the right side of FIGURE 8(f) leaving a reinfored concrete structure. The foam layer 18' may be removed by simply cutting the material with a knife or other sharp instrument; the foam may be removed chemically with a solvent or the like; or the foam may be removed by controlled burning or combustion thereof. However, it is contemplated that the removal of the plastic foam layer 18' may not be necessary and that the final structure may be as shown in FIGURE 7 including the inner plastic foam layer 18' and the outer concrete layer 21 with reinforcing members 46 arranged within the concrete of the layer 21 and inside channels 45 provided in the layer 18'.

This invention may include the erection of a roof structure as shown in FIGURE 11 rather than a complete unitary building structure as shown by FIGURES 1, 4 and 7. In FIGURE 11 a foundation and opposed spaced walls 50 of a building may be erected by conventional means. A form of impervious plastic material is secured to the top of the walls and will initially hang downwardly as indicated by dashed lines 51 in FIGURE 12(a). The complete enclosure including the walls of the building and the roof form is made inflatable by plugging or closing all major openings; and an air compressor 28 will force air into the building under the form. The form will expand upwardly into an arched or arcuate shape as shown by the solid line 52, FIGURE 12(a). As in the case of FIGURES 2(a) and 4, wall thickness gauge blocks 29 may be secured to the form 52; and thence a layer 18 of plastic foam is applied to the underside thereof. FIGURE 12(b) shows the partial completion of the roof structure with the impervious plastic layer 52 and the plastic foam layer 18. Tension rods 53 may be secured to the opposed spaced walls 50 and tightened by means such as turnbuckles 54, FIGURES 11 and 13. The foam layer 18 is self-supporting and after securing the necessary reinforcing members or rods in place as previously described, a concrete layer 20 may thence be sprayed to the underside of the layer 18 to provide a strong rigid roof structure.

As shown in FIGURE 13, the upper portion of the walls 50 may be formed with a ledge or toe part 55 to support the concrete layer 20. Reinforcing members 56 may be provided extending outwardly from the walls 50. Further reinforcing members 57 may span across the roof structure being appropriately positioned and supported by the foam layer and embedded within the concrete layer 20. In FIGURE 17 a gutter 58 is shown as it may be provided optionally to complete the roof structure of this invention. If the gutter is to be provided it will be attached to a ledge part 59 at the top of each wall 50. In certain cities and other jurisdictions, fire and zoning regulations require a parapet 60 on buildings. If the building is to be provided with such a parapet it may replace the ledge part 59 and the gutter 58.

From the foregoing, it will be appreciated that this invention provides a simple and relatively economical method for erecting a plastic or concrete structure without the use of the expensive and time consuming construction of forms. Although the plastic and/or fabric forms, described heretofore, are of light weight and are held up by air pressure, these forms are substantial enough to receive and hold the light weight plastic foam sprayed thereagainst from the inside. Since polyurethane resin foam will harden and become self-supporting in only a few seconds' time, the form need not support any great mass of unsolidified material. For small structures the spraying operation may be commenced at the base or lower portions of the layer 18 and continued upwardly such that the spraying of the layer 18 is terminated in the uppermost regions. In this manner each newly sprayed area of the layer 18 receives considerable support from the previously sprayed areas which have already hardened, and no undue strain will be placed upon the pneumatic form. For larger structures the spraying operation may preferably be done in successive layers. The first layers may be supported by increasing the pressure within the pneumatic form and the subsequent layers being supported by the hardened first layers. The final result being a plastic foam structure with walls of adequate thickness and strength to support itself and subsequent layers of gunite without the assistance of the original air pressure.

In those embodiments of this invention shown in FIGURE 4, FIGURE 7 and FIGURE 11, the hardened layer of plastic foam is essentially used as a form for subsequent steps of spraying concrete. The spraying of concrete is commonly known as a "gunite" process wherein the liquid or plastic concrete mixture is sprayed against the surface to build up a layer. Concrete may require several hours to harden and become self-supporting, and during this period the concrete is supported by the plastic foam layer 18. If the desired concrete thickness is substantial, several successive layers of concrete may be applied, rather than a single layer which may tax the strength of and deform the plastic layer 18. Thus, if it is desired to build up a concrete thickness of two inches, four successive layers each one half inch thick may be applied, and a sufficient time may be allotted such that the first layer will have commenced to harden and will have become at least partially self-supporting before the second layer is applied. Each subsequent layer of concrete will receive support from the previous layers, and the total weight of the completed structure will not combine to unduly deflect and deform the plastic supporting layer 18. Temporary bracing may be desirable for the foam layer when spans are substantial and until the concrete layers have cured and become completely self-supporting.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A method for erecting a structure comprising: inflating a form, positioning thickness gauges within the inner surface of the form, said thickness gauges being preformed from a plastic foam material, spraying an additional quantity of the same plastic foam material against the inside of the form to build up a layer having a thickness determined by the thickness gauges which become integral with the layer, and allowing the plastic foam to harden and become rigid and self-supporting.

2. A method for erecting a structure, said method comprising laying a foundation, securing an inflatable form to the foundation, inflating the form, spraying a plastic foam material against the form from the inside thereof, and allowing the foam material to harden into a self-supporting layer.

3. A method for erecting a structure comprising: laying a foundation and floor structure, securing an inflatable form to the foundation, inflating the form with air pressure, spraying polyurethane foam against the form from the inside thereof to build up a self-supporting layer, and cutting a door opening through said foam layer.

4. A method for erecting a cold storage compartment, said method comprising: laying a circular foundation and slab, securing an inflatable form of an impervious plastic sheet material to the foundation, inflating the form with air pressure, coating the inner surfaces of the form and the surface of the slab with a polyurethane foam material to create a self-supporting structure with the impervious plastic material constituting an outer skin, and providing a working floor surface over the coating of foam material on the slab.

5. A method for erecting a building comprising: laying a circular foundation and slab; securing an inflatable form of impervious plastic material thereto; inflating the form with air pressure; spraying plastic foam against the inside of the form, allowing the foam to harden into a self-supporting layer; and coating the inside of the layer of foam with a layer of concrete.

6. A method for erecting a reinforced concrete building comprising: laying a foundation and slab; securing an inflatable form of impervious plastic material thereto; inflating the form with air pressure; spraying plastic foam material against the inside of the form, allowing the foam material to become rigid and to become a self-supporting layer; inserting a plurality of hanger devices into the layer of rigid foam material; positioning reinforcing members spaced from the layer of rigid foam material and supported by the hanger devices; and coating the inside of the layer of rigid foam material with a layer of concrete having the reinforcing members imbedded therein.

7. A method for erecting a structure, said method comprising: inflating a form by injecting air under pressure therein, said form permitting a continuous seepage of air to escape therethrough, placing impervious sheet material against the inner surface of the form, spraying a plastic foam material against the sheet material from inside the form, allowing the foam material to harden into a self-supporting layer, and removing the form from the outside.

8. A method for erecting a reinforced structure, said method comprising: inflating a form by forcing air under pressure therein, said form being of material which permits air to escape by seepage therethrough, placing elongated members against the form on the inside thereof, said elongated members partially blocking the seepage of air through the form and being supported against the form by a pressure differential, spraying a plastic foam material against the form from the inside thereof and around the elongated members, allowing the foam to harden into a self-supporting layer, removing the elongated members to create channels in the hardened foam layer, and installing reinforcing members in the channels.

9. A method for erecting a reinforced structure, said method comprising: inflating a form by forcing air under pressure therein, said form being of material which will permit air to escape by seepage therethrough, placing elongated balloons against the form on the inside thereof, placing sheets of impervious material over the balloons and against the form on the inside thereof, spraying a plastic foam in a layer against the impervious sheets from the inside of the form, allowing the foam to harden into a self-supporting layer, removing the form, allowing voids caused by the balloons to create channels in the outer surface of the hardened foam layer, installing reinforcing members in to the channels and covering the reinforcing members with a grout.

10. A method for erecting a reinforced structure in accordance with claim 9 wherein the reinforcing members within the channels are covered by spraying a concrete mixture thereupon, and wherein the entire outer surface of the structure is covered with a layer of concrete which will set and harden integrally with the concrete mixture sprayed upon the reinforcing members.

11. A method for erecting a roof structure over walls of a building, said method comprising: securing a flexible form to walls, forcing air under pressure into the building to expand the form upwardly in an arch spanning between the walls, spraying a plastic foam material against the under surface of the form, and allowing the foam to harden into a self-supporting layer.

12. A method for erecting a roof structure over walls of a building, said method comprising: securing an impervious plastic form to the walls; forcing air under pressure into the building to expand the form upwardly into a curve spanning between the walls; spraying a plastic foam material against the under surface of the form; allowing the foam to become rigid and become a self-supporting layer; and spraying a concrete mixture against the under surface of the foam layer.

13. The method in accordance with claim 12 further comprising: inserting hanger devices into layers of rigid foam; and positioning reinforcing members spaced from the layer of rigid foam and supported by the hanger devices whereby the reinforcing members will ultimately be embedded in the concrete mixture.

References Cited by the Examiner
UNITED STATES PATENTS

| | | |
|---|---|---|
| 1,869,265 | 7/1932 | Leriche et al. |
| 2,194,341 | 3/1940 | Voorhees. |
| 2,223,418 | 12/1940 | Hewett _____ 50—52 |
| 2,270,229 | 1/1942 | Neff _____ 25—154 |
| 2,272,382 | 2/1942 | McCloskey _____ 50—52 X |
| 2,315,895 | 4/1943 | Crom. |
| 2,335,300 | 11/1943 | Neff. |
| 2,345,775 | 4/1944 | Smith et al. _____ 117—96 XR |
| 2,370,638 | 3/1945 | Crowe. |
| 2,388,701 | 11/1945 | Neff. |
| 2,469,603 | 5/1949 | LeTourneau _____ 50—52 |
| 2,764,566 | 9/1956 | Simon et al. |
| 2,892,239 | 6/1959 | Neff _____ 25—154 |
| 2,964,821 | 12/1960 | Meechan. |
| 3,030,259 | 4/1962 | Long. |
| 3,088,172 | 5/1963 | Weinbrenner et al. 264—45 XR |
| 3,184,210 | 5/1965 | Fassnacht et al. ___ 264—54 XR |

FOREIGN PATENTS

| | | |
|---|---|---|
| 602,856 | 8/1960 | Canada. |

OTHER REFERENCES

Engineering News Record; Jan. 12, 1961; pp. 22 and 23.

In Kunststoffe, vol. 53, No. 10, October 1963, p. 774–776; Peter Hoppe, "Baukonstruktionen unter Verwendung harter Schaumstoffe"; with its condensed translation: "Use of rigid foams in building constructions"; In German Plastics bound with Kunststoffe, p. 22.

Mobay Chemical Co. booklet, "Rigid urethane foam . . . a new concept in structural design," Pittsburgh, c. 1963, pp. 3–5, 11, 15.

Mobay Chemical Co., "Your stake in urethane foam products; the urethanes grow up—part 2," pp. 1–3 (reprint from Modern Plastics, April 1959), copy in 264—54.

Science News Letter, Sun Proof Igloo, Jan. 2, 1960, vol. 77, No. 1, page 7.

ALEXANDER H. BRODMERKEL, *Primary Examiner.*

WILLIAM A. MUSHAKE, ROBERT F. WHITE, *Examiners.*

E. J. WITMER, P. E. ANDERSON, *Assistant Examiners.*